June 24, 1952  B. COOPER ET AL  2,601,370
VEHICLE ASSIGNING, DETECTING, AND DISPATCHING SYSTEM
Filed July 21, 1950  3 Sheets-Sheet 2
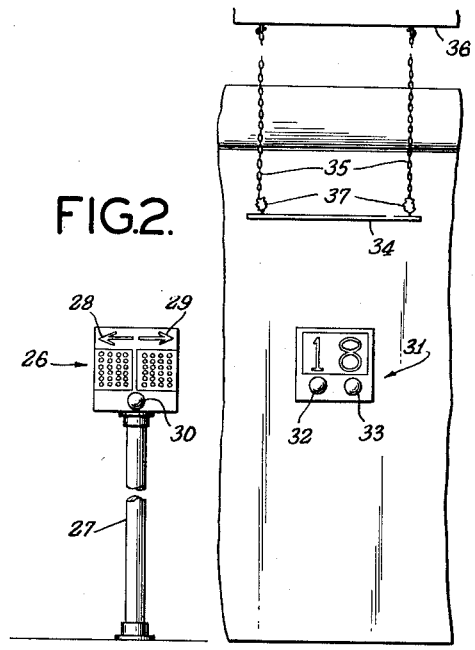
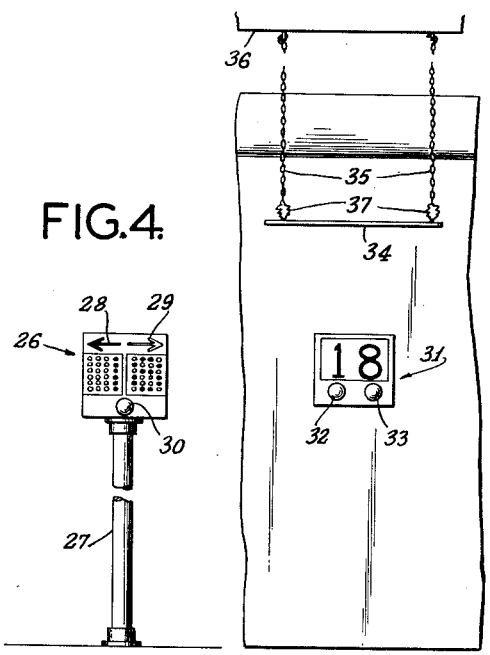
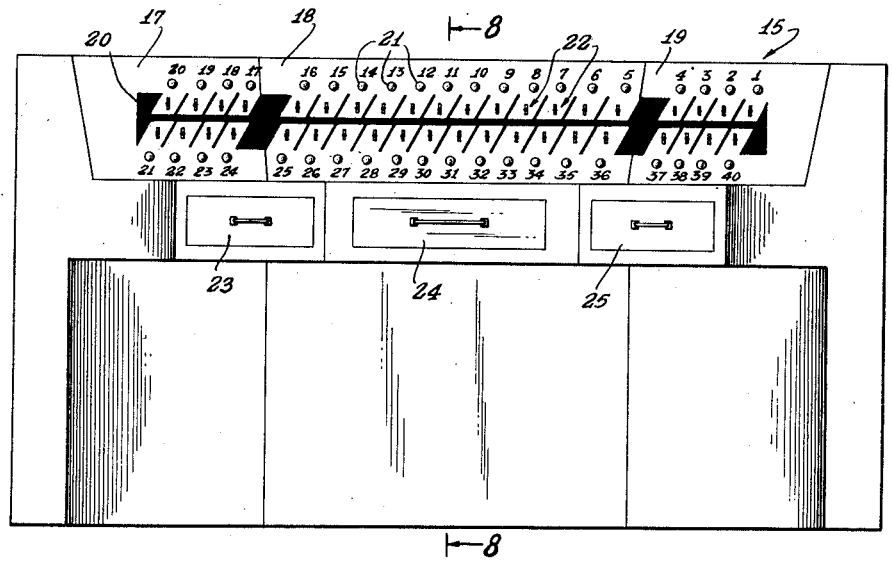
FIG. 6.
INVENTORS.
BENJAMIN COOPER
STANLEY A. KROLL
BY
J. B. Felshin
ATTORNEY.

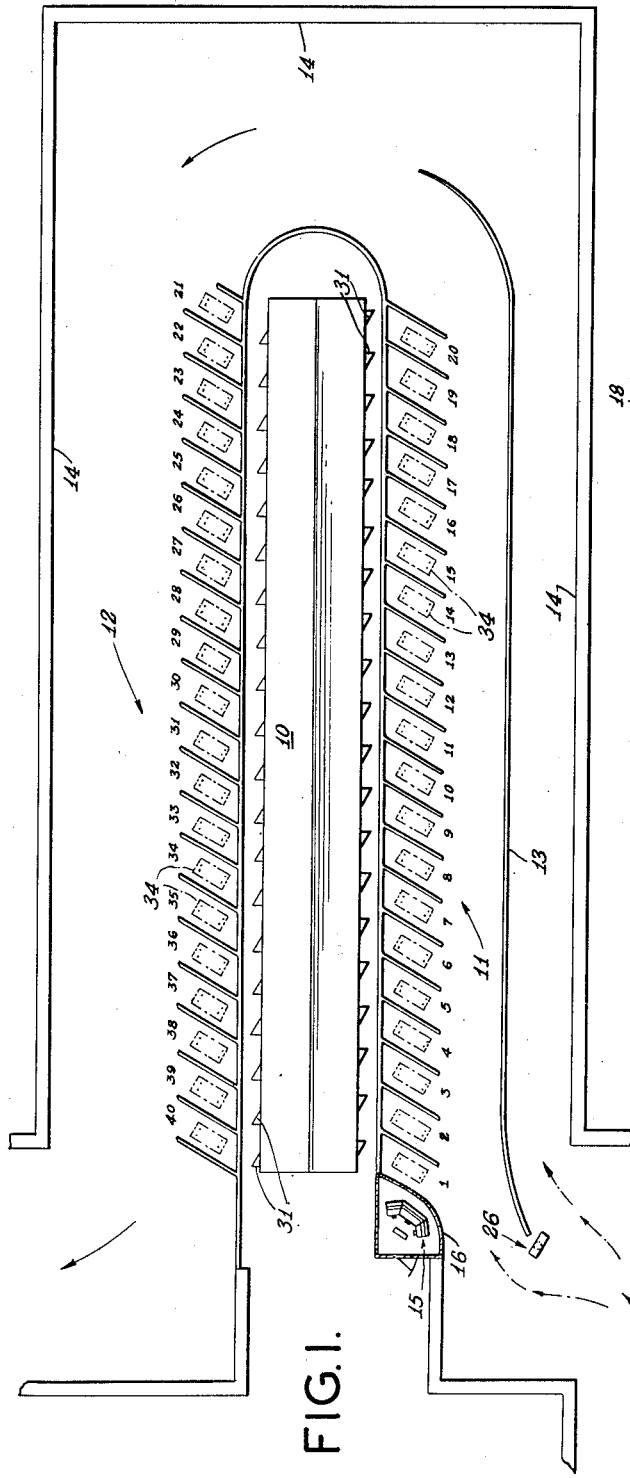
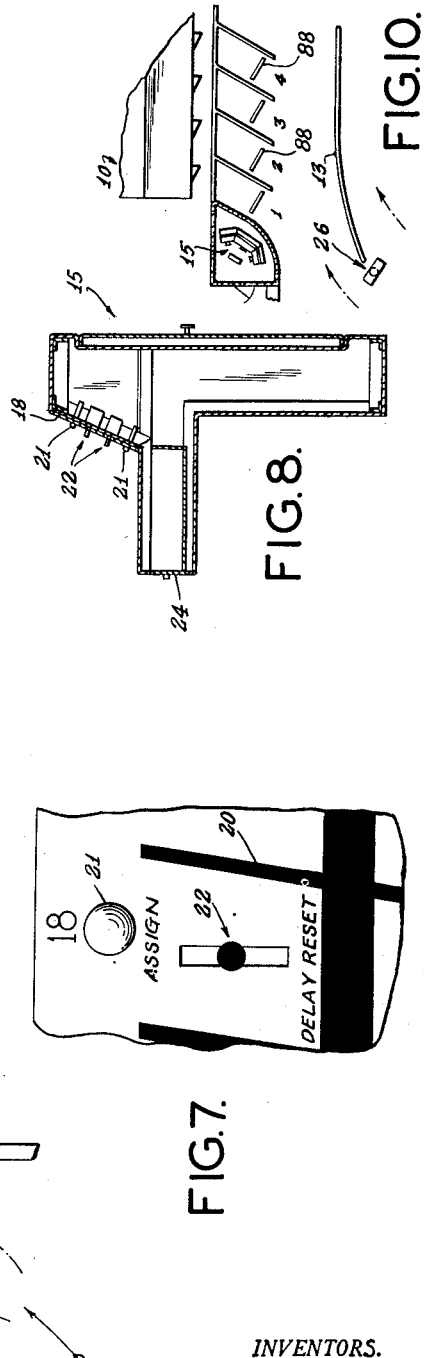

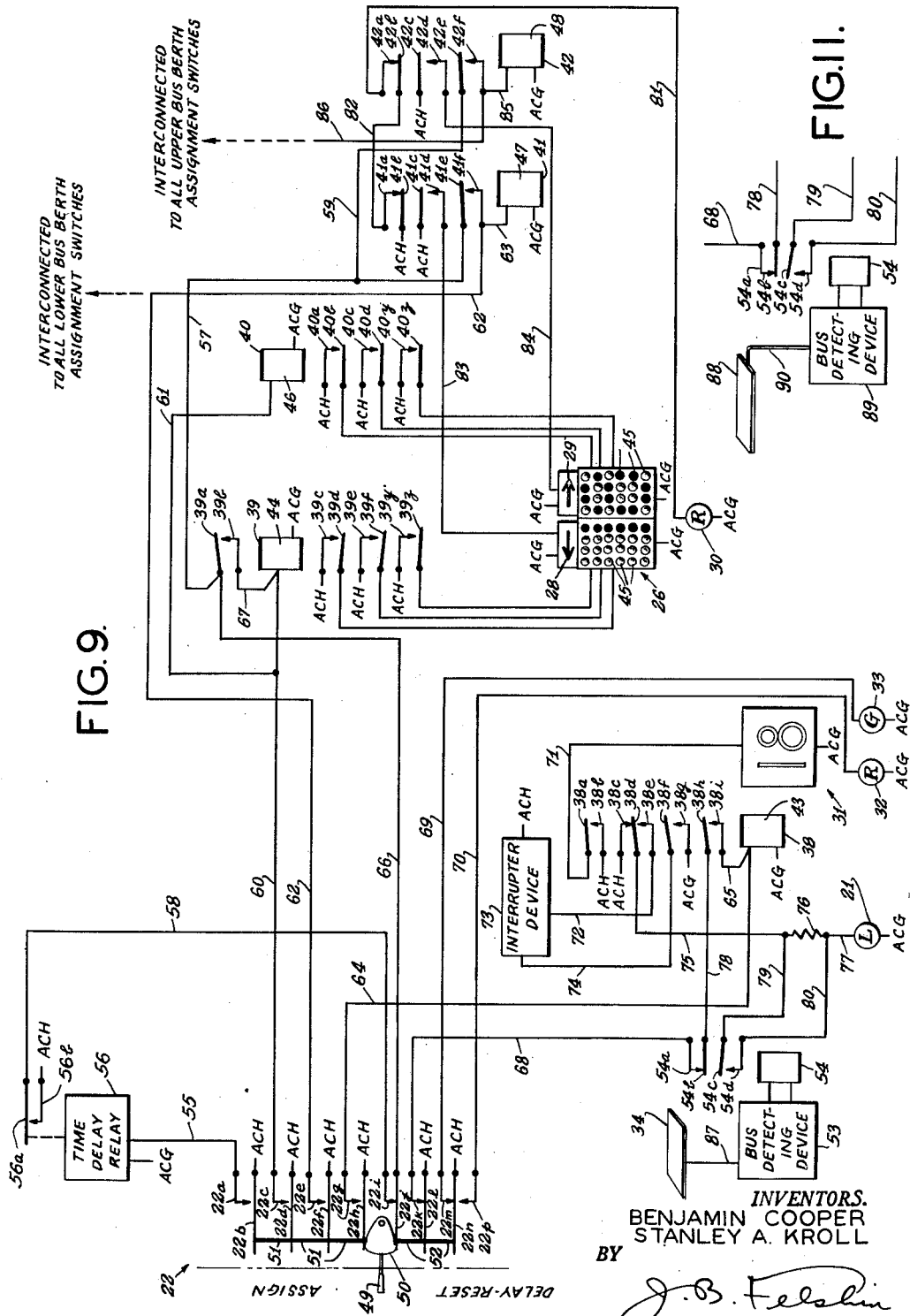

Patented June 24, 1952

2,601,370

UNITED STATES PATENT OFFICE 2,601,370

VEHICLE ASSIGNING, DETECTING, AND DISPATCHING SYSTEM

Benjamin Cooper, New York, and Stanley A. Kroll, Brooklyn, N. Y.; said Kroll assignor to said Cooper Application July 21, 1950, Serial No. 175,134

25 Claims. (Cl. 177—311)

This invention relates to a traffic control system for vehicles and is particularly directed to a system for assigning, detecting and despatching busses at a multi-berth bus terminal.

One object of this invention is to provide an automatic system whereby a single despatcher at a control desk can control the assignment of incoming busses to particular individual bus berths of a multi-berth bus terminal.

Another object of this invention is to provide a system of the character described whereby the despatcher can, if necessary, signal the driver to retain a departing bus in its berth.

Another object of this invention is to provide a system of the character described whereby the despatcher can tell by glancing at his control desk the bus traffic conditions throughout the entire bus terminal.

Another object of this invention is to provide a system of the character described that is provided with signal means to indicate whether or not the system is in proper working order.

A further object of this invention is to provide a bus despatching system that is simple and efficient, yet effective in controlling incoming and departing bus traffic so that there is a minimum of confusion and delay.

Other objects of this invention will in part be obvious and in part hereinbelow pointed out.

The invention, accordingly, consists in the features of construction, combination of elements and arrangement of parts which will be exemplified in the construction hereinbelow described and of which the scope of application will be indicated in the appended claims.

In the accompanying drawings, in which two of the various possible embodiments of this invention are illustrated, Fig. 1 shows a plan view of a multi-berth bus terminal;

Fig. 2 is an elevational view of the berth assignment sign;

Fig. 3 is an elevational view showing a typical berth number and departure signal sign; also shown is the overhead plate for berth occupancy detection.

Fig. 4 is an elevational view of the berth assignment sign energized to assign a bus to berth No. 18;

Fig. 5 is a view as in Fig. 3 with the berth number sign illuminated as a signal to the driver of the bus assigned to berth No. 18;

Fig. 6 is an elevational view of the despatcher's control desk;

Fig. 7 is an enlarged fragmentary view showing the mimic panel indicator light and control switch for a bus berth;

Fig. 8 is cross-sectional view taken along the line 8—8 of Fig. 6;

Fig. 9 is an electrical circuit diagram of the system;

Fig. 10 is a partial view of Fig. 1 showing a modification in which treadles are used in the bus berths for bus detection; and Fig. 11 is a partial modification of Fig. 9 showing how a treadle operated device may be substituted in the circuit for bus detection.

Referring now to the drawings, Fig. 1 represents a plan view of a bus terminal comprising a central station building 10 having a plurality of bus berths 11 numbered consecutively from 1 to 20 at one side of the station and a plurality of bus berths 12 numbered consecutively from 21 to 40 at the opposite side of the station. Bus travel is in the counter-clockwise direction around the terminal, as indicated by the arrows; busses assigned to berth numbers 1 to 20 being directed, as described hereinbelow, to pass into the lane between the curbing 13 and the lower bus berths (those numbered from 1 to 20), and busses assigned to berth numbers 21 to 40 being directed to pass into the lane between curbing 13 and exterior curbing 14 and around the end of the terminal to the upper bus berths (those numbered from 21 to 40).

A despatcher's control desk 15 is positioned within clear view of the bus entrance, preferably being located behind a glass panel 16 as shown in Fig. 1. It is from his position behind the control desk that the despatcher directs entering and departing busses.

The despatcher's control desk comprises enclined panels 17, 18 and 19 facing the despatcher's position and on which is delineated a mimic layout 20 of the berths in the terminal, each berth position being numbered to correspond with the actual berth represented. Each mimic berth position on the layout 20 is provided with an indicator light 21 and a lever control switch 22 normally in a central position but movable by the despatcher upwardly to an "assign" position or downwardly to a "delay reset" position, as hereinbelow detailed. (Fig. 7.)

The control desk is preferably provided with front utility drawers 23, 24 and 25; the remainder of the interior of the desk being available for components of the electrical system hereinbelow described.

There is further provided a berth assignment sign 26, mounted as by post 27 at the bus entrance to the terminal. Said sign is of the type comprising a plurality of lamps which may be selectively lighted to illuminate an outline of any one- or two-digit numbers; and serves to indicate to an incoming bus driver the number of the berth to which he is assigned. The berth assignment sign is provided with neon light arrows 28 and 29, one of which, upon assignment of a bus to a berth, becomes illuminated to direct the bus to the proper side of central curbing 13 to reach the assigned berth.

There is further provided in the berth assignment sign a red stop light 30, illuminated at all times except when said sign is energized to direct a bus to a berth.

Each berth is provided with its individual berth number sign and departure signal unit 31 which may be mounted against the wall of the terminal facing toward its berth so as to readily be visible to a driver as he approaches and enters the berth. Said number sign is illuminated to display the berth number only when a bus is assigned to its particular berth, and it remains illuminated until the bus has entered the berth. There is provided in each of said units a green signal light 32 and a red signal light 33, comprising the departure signals. Normally, the green light is illuminated, the red light alternately being illuminated by the despatcher from his control desk only when he desires to delay departure of the bus.

Each berth is further provided with detector means to automatically detect when a bus is in the berth. Said detector means may be any one of the commonly employed types of intrusion detectors, such as treadle operated detectors, interrupted light beam detectors and electrical capacity detectors.

The use of a capacity type detector device is illustrated in Figs. 1 and 9. Such an intrusion detector is fully described in U. S. patent application titled: Electric Control Devices Responsive to Small Changes in Capacitance, Serial No. 139,311, filed January 18, 1950, assigned to applicant, now abandoned. Figs. 1, 3 and 5 show how capacity detector plates 34 may be suspended in the berths above the height of a bus as by chains 35 from ceiling 36 insulated from said plates as by insulators 37. Said plates are each connected to their individual detector units as hereinbelow detailed.

A modification showing the use of a treadle operated detector is shown in Figs. 10 and 11. Such a treadle operated device is fully described in U. S. patent application titled: Vehicle Detecting Device, Serial No. 175,133, filed July 21, 1950, now Patent No. 2,578,046 assigned to applicant. Fig. 10 shows how the treadles 88 may be located in the floor of the bus berth entrances so as to be actuated when a bus enters or leaves a berth.

Referring now to Fig. 9, the berth assignment sign 26, neon light arrows 28 and 29 and stop light 30 are shown interconnected with the control switch 22, the indicator light 21, the number sign and departure signal unit 31 and the capacity detector plate 34, all associated with representative berth number 18. Included in said circuit are berth auxiliary relay 38, assignment sign auxiliary relays 39 and 40 and neon light arrow auxiliary relays 41 and 42. Relay 38 has a winding 43, one end of which is connected to ACG, one terminal of an alternating current source of supply. Said relay has associated with it movable switch arms 38a, 38f, and 38h, each normally open-circuited, but adapted to be moved into contact with fixed contact arms 38b, 38g, and 38i, respectively, when said relay is energized. Said relay is further provided with movable contact arm 38d, normally in contact with fixed contact arm 38c, but adapted to be moved therefrom into contact with fixed contact arm 38e when said relay is energized.

Relay 39 has an energizing coil 44, one terminal of which is connected to one terminal of the source of supply, ACG. Said relay has associated with it a normally open switch 39a, 39b, adapted to be closed-circuited when said relay is energized. Said relay is also provided with a multiple of normally open switches 39c, 39d; 39e, 39f . . . 39y, 39z, adapted to be closed-circuited when said relay is energized. The purpose of said last switches is to close circuits to energize the proper individual lamps 45 in the "unit" side of berth assignment sign 26 to represent the "unit" digit of the berth number assigned. In the case where berth number 18, for example, is selected, there would be six such switches in energizing circuits to the individual lamps 45 shown in black in the "units" side of the signs.

Relay 40 has an energizing coil 46, one terminal of which is connected to the source of supply ACG. Said relay has associated with it a multiple of normally open switches, 40a, 40b; 40c, 40d . . . 40y, 40z, adapted to be closed-circuited when said relay is energized. The purpose of said last switches is to close circuits to energize the proper individual lamps 45 in the "tens" side of the berth assignment sign 26 to represent the "tens" digit of the berth number assigned. In the case where berth number 18, for example, is selected, there would be twelve such switches in energizing circuits to the individual lamps 45 shown in black in the "tens" side of the sign.

Relay 41 is provided with an energizing coil 47, one terminal of which is connected to the source of supply ACG. Associated with said relay are normally open switches 41c, 41d and 41e, 41f, adapted to be closed-circuited when said relay is energized, and normally closed switch 41a, 41b, adapted to be open-circuited when said relay is energized.

Relay 42 is provided with an energizing coil 48, one terminal of which is connected to the source of supply ACG. Associated with said relay are normally open switches 42c, 42d and 42e, 42f, adapted to be closed-circuited when said relay is energized, and normally closed switch 42a, 42b, adapted to be open-circuited when said relay is energized.

Control switch 22 comprises switches 22a, 22b; 22c, 22d; 22e, 22f and 22g, 22h, each normally open-circuited, but adapted to be respectively closed-circuited upon movement of switch lever 49, attached to pivoted cam 50, in the upward or "assign" position. Said switches are ganged, so as to operate together, as by Bakelite members 51 between the movable arms of said switches.

Control switch 22 is further comprised of normally closed switches 22i, 22j; 22k, 22l; and 22m, 22n, adapted to open-circuited when switch lever 49 is moved downwardly to the "delay-reset" position, and normally open switch 22n, 22p, adapted to be closed-circuited when said lever is moved downwardly to the "delay-reset" position. Said last switches are likewise ganged, as by Bakelite members 52, to operate simultaneously.

The movable switch arms 22b, 22d, 22f, 22h, 22l, and 22n are each connected to ACH.

Bus detecting device 53 is operative to energize its relay 54 when a bus is in its associated berth. Said device is connected, as by conductor cable 87, to the detector plate 34 in said berth.

Relay 54 has a switch 54a, 54b, normally closed but adapted to be open-circuited when said relay is energized, and a switch 54c, 54d, normally open, but adapted to be closed-circuited when said relay is energized.

Switch contact arm 22a is connected as by wire 55 to one energizing terminal of a time delay relay device 56, the remaining energizing terminal of said time delay relay being connected to ACG. Said relay has associated with it a switch 56a, 56b, normally open, but adapted to be closed-circuited and remain closed-circuited for a predetermined length of time after the de-energization of said relay. Such time delay relays are well known in the art. Fixed contact arm 56b is connected to ACH. Movable contact arm 56a is connected as by wire 58 to fixed contact arm 22i.

Fixed contact arm 22c is connected by wire 60 to the remaining terminal of coil 44 associated with relay 39. The remaining terminal of coil 46 associated with relay 40 is connected by wire 61 to wire 60.

Fixed contact arm 22e is connected by wire 62 to fixed contact arm 41f associated with relay 41. Said contact arm is also connected as by wire 63 to the remaining terminal of coil 47 associated with said relay.

Fixed contact arm 22g is connected as by wire 64 to the remaining terminal of coil 43 associated with relay 38. Said terminal is also connected, as by wire 65, to fixed contact arm 38i associated with said relay.

Movable contact arm 22j is connected by wire 66 to movable contact arm 39a associated with relay 39. Movable contact arm 39a is also connected, as by wire 57, to movable contact arm 41e. Movable contact arm 42e is connected by wire 59 to wire 57. Fixed contact arm 39b is connected by wire 67 to the remaining terminal of coil 44 associated with relay 39.

Fixed contact arm 22k is connected by wire 68 to fixed contact arm 54a associated with relay 54.

Fixed contact arm 22m is connected by wire 69 to one energizing terminal of green light 33 associated with number sign and departure signal unit 31, the other terminal of said green light being connected to ACG. Fixed contact arm 22p is connected by wire 70 to one energizing terminal of red light 32 associated with said unit, the other terminal likewise being connected to ACG.

Movable contact arm 38a is connected by wire 71 to one energizing terminal for illuminating the number of the berth number sign 31. The remaining terminal is connected to ACG.

Fixed contact arms 38b and 38c associated with relay 38 are connected to ACH. Fixed contact arm 38g is connected to ACG. Movable contact arm 38e is connected as by wire 72 to the output terminal of interrupter device 73, which may be any one of those known in the art, which when energized, supply an interrupted source of supply voltage.

Said interrupter device has one energization terminal connected to ACH and the other terminal connected as by wire 74 to movable contact arm 38f.

Movable contact arm 38d is connected as by wire 75 to one side of series dimming resistor 76, the other side of said resistor being connected as by wire 77 to one terminal of indicator light 21. The remaining terminal of said indicator light is connected to ACG.

Movable contact arm 54b is connected by wire 78 to movable contact arm 38h. Movable contact arm 54c is connected as by wire 79 to one terminal of resistor 76, and fixed contact arm 54d is connected as by wire 80 to the other terminal of said resistor.

Movable contact arms 41b and 41c, associated with relay 41, are each connected to ACH. Movable contact arm 42c, associated with relay 42, is likewise connected to ACH.

Fixed contact arm 42a is connected as by wire 81 to one energizing terminal of stop light 30 associated with the berth assignment sign 26. The remaining terminal of said light is connected to ACG. Fixed contact arm 41a and movable contact arm 42b are interconnected as by wire 82. Fixed contact arm 41d is connected as by wire 83 to one energizing terminal of the "left" neon light arrow 28 associated with berth assignment sign 26. Fixed contact arm 42d is connected as by wire 84 to one energizing terminal of the "right" neon light arrow 29. The remaining terminals of said neon light arrows are connected to ACG.

Fixed contact arm 42f is connected by wire 85 to coil 48 of its associated relay.

Referring now to Fig. 9, and considering the overall operation of the system, assume that a bus is about to enter the bus terminal. When the bus reaches the berth assignment sign the driver will be signaled stop to await assignment by energized red stop light 30. The energizing circuit can be traced from ACH through normally closed switch 41a, 41b, wire 82, normally closed switch 42a, 42b, wire 81 and red light 30 to ACG.

The despatcher, having decided into which one of the available berths he wishes to direct the bus, moves the corresponding lever control switch 22 upwardly momentarily to the "assign" position. The consequent closure of the "assign" switches of said switch will complete a circuit to time delay relay 56 from ACH through momentarily closed switch 22a, 22b, wire 55, time delay relay 56 to ACG. At the same time, energizing circuits will be completed to the relays 39 and 40, said circuits being from ACH, through momentarily closed switch 22c, 22d, wire 60 through coil 44 to ACG for relay 39; and through said switch, wires 60 and 61, through coil 46 to ACG for relay 40. Upon energization of relay 39, the closure of its associated switch 39a, 39b will complete a holding circuit for its continued energization and the continued energization of relay 40 through the switch 56a, 56b associated with time delay relay 56. Said circuit can be traced from ACH, through now closed switch 56a, 56b, wire 58, normally closed switch 22i, 22j, wire 66, now closed switch 39a, 39b, wire 67 through coil 44 to ACG for relay 39; and from ACH, through closed switch 56a, 56b, wire 58, normally closed switch 22i, 22j, wire 66, now closed switch 39a, 39b, wires 67, 60, and 61 through coil 46 to ACG for relay 40. It will thus be evident that the relays 39 and 40 will remain energized for the predetermined length of time after the momentary closure of the "assign" switches during which switch 56a, 56b associated with the time delay relay 56 remains closed-circuited. The energization of relays 39 and 40 will close their associated switches energizing circuits to their respective lamps 45 in the "units" and "tens" sides of the berth assignment sign to indicate to the driver, for said predetermined length of time, the number of the berth to which he has been assigned.

The momentary closure of the "assign" switches will also complete an energizing circuit to relay 41, said circuit being from ACH, through momentarily closed switch 22e, 22f, wires 62 and 63, through coil 47 to ACG. The energization of said relay will complete a "holding" energizing circuit through time delay switch 56a, 56b, so that said relay is maintained energized for said predetermined length of time. Said circuit can be traced from ACH, through switch 56a, 56b, wire 58, now closed switch 22i, 22j, wires 66 and 57, now closed switch 41e, 41f, wire 63, through coil 47 to ACG. The energization of relay 41 will open circuit its associated switch 41a, 41b, opening the circuit above detailed, to red stop light 30. It will thus be evident that when the berth assignment sign is energized to show a berth number, said stop light will be de-energized.

The energization of relay 41 will also complete an energization circuit to neon light arrow 28 on the berth assignment sign, indicating to the driver that in order to reach the assigned berth number he should enter the lane to the left.

It should be noted here that if the berth assigned to happened to be one of those at the upper side of the terminal, i. e. one of those numbered from 21 to 40, relay 42, instead of relay 41, would become energized through wire 83, which is interconnected to all upper berth assignment switches, and the neon light arrow 29 would be energized to direct the bus driver to the right and around to the upper berths. Circuit operation is the same as that detailed for relay 41.

The momentary closure of the "assign" switches also completes a circuit to energize relay 38, said circuit being from ACH, through momentarily closed switch 22g, 22h, wire 64 through coil 43 of said relay to ACG. The energization of relay 38 completes a holding circuit to keep it energized after switch 22g, 22h is open-circuited. Said circuit can be traced from ACH through normally closed switch 22k, 22l, wire 68, normally closed switch 54a, 54b, wire 78, now closed switch 38h, 38i, wire 65 through coil 43 of relay 38 to ACG. The energization of said relay completes an energizing circuit to the berth assignment sign 31 for the corresponding berth; said circuit being from ACH through now closed switch 38a, 38b, wire 71, through said berth number sign to ACG. Thus the berth number sign to which the bus has been directed will be illuminated to indicate to the driver where his particular assigned berth is.

Berth indicator light 21 is normally dimly lighted, its energizing circuit being from ACH, through normally closed switch 38c, 38d, wire 75, dimming resistor 76, wire 77 through said indicator light to ACG. Said light, being dimly lighted, is an indication to the despatcher that the corresponding berth is unoccupied. Upon the actuation of the assignment switch, and the consequent energization of relay 38, as above detailed, a circuit is completed to energize said assignment light through interrupter device 73, said circuit being from ACH, through said interrupter device, output wire 72, now closed switch 38d, 38e, wire 75, dimming resistor 76, wire 77, through indicator lamp 21 to ACG. Consequently, said indicator lamp will flash on and off, indicating to the despatcher that an assigned bus is in transit to the corresponding berth. It should be noted here that said interrupter device is set into operation by the energization circuit from ACG through now closed switch 38f, 38g, associated with relay 38, wire 74, through the interrupter device to ACH.

Upon the bus entering its assigned berth, bus detector device 53 will energize relay 54 to actuate its associated switches 54a, 54b, and 54c, 54d. The consequent open-circuiting of switch 54a, 54b will break the above detailed holding circuit to relay 38, deactuating its associated switches. As a result, the berth sign 31 will become de-energized, its energization circuit through switch 38a, 38b now being open circuited; the energization circuit to berth indicator light 21 will be returned directly to the steady source of voltage supply ACH through now closed switch 38c, 38d; and the interrupter device 73 will be de-energized, its energizing circuit through now open switch 38f, 38g now being open-circuited. At the same time, now actuated switch 54c, 54d will close the circuit through the wires 79 and 80 to shunt out voltage-dropping or dimming resistor 76. It will thus be evident that as soon as the bus enters the assigned berth, the berth indicator light 21 will be energized through a closed circuit directly to ACH and consequently will be illuminated steadily at full brilliance as an indication to the dispatcher that the bus is in its berth.

Fig. 11 shows how the treadle controlled bus detecting device 89, interconnected to treadle 88 as by cable 90, may alternately be employed to detect the entrance and departure of a bus in a berth by controlling the relay 54.

Green signal light 33, associated with berth assignment sign 31 is normally illuminated, its energization circuit being from ACH, through normally closed switch 22m, 22n, wire 69, through said signal light to ACH. If the despatcher finds it necessary to delay a bus scheduled to depart, he moves the lever control switch for the particular berth downwardly to the "delay-reset" position for the duration of the delay, thus effecting the de-energization of the above detailed circuit to green signal light 33 and effecting the energization of red signal light 32 as a signal to the driver not to leave the berth. The energization of said red signal light can be seen to be from ACH, through now closed switch 22n, 22p, wire 70, through the signal light to ACG. Since a delay may be several minutes, it is preferable that the berth assignment switch 22 be one of those known in the art that automatically maintains itself in actuated condition in the downward or "delay-reset" position until subsequently manually released.

If the despatcher finds it necessary for any reason to change an assignment made before a bus has passed the berth assignment sign, it is only necessary for him to move the corresponding assignment switch downwardly momentarily in order to terminate the above-detailed sequence of automatic circuit operations and set the particular berth system at normal condition. Thus the open-circuiting of switch 22i, 22j in the "holding" energizing circuits, above-detailed, for corresponding relays 39, 40 and 41 will immediately de-energize the illuminated assignment number (provided said predetermined length of time, in the order of 15 or 20 seconds, has not been exceeded, in which case it will already have become de-energized), and restore illumination of red stop signal 30. At the same time, the momentary open-circuiting of switch 22k, 22l will interrupt the above detailed "holding" circuit to relay 38, thereby returning its associated circuits to normal. It is therefore evident that a second assignment can now be made immediately, and the wrongly assigned berth circuits will be in "reset" condition and ready for subsequent assignment.

It should be noted in connection with the foregoing description that for berths numbered 1 to 9 the "tens" assignment number relay 40 is not needed and may be omitted from the circuits associated with those berths.

It will thus be evident that there is provided a device in which the several objects of this invention are achieved, and which is well adapted to meet the various conditions of practical use.

Having thus described our invention, we claim as new and desire to secure by Letters Patent:

1. In combination, a plurality of berths, each adapted to receive an automotive vehicle which may be driven into any one of said berths, a lane communicating with all of said berths, an approach lane leading to the first lane, a berth assignment sign, including electric signal means in the approach lane and in advance of the first lane, and including visual indicator means corresponding to each one of said berths, means to selectively energize one of said indicator means to indicate to the driver of a vehicle into which berth he should drive the vehicle, an additional electric visual signal means in said sign and means to automatically energize said additional signal means a predetermined time after said indicator means has been energized, and to automatically de-energize said additional signal means whenever any one of said indicator signal means is energized.

2. In combination, a plurality of berths, each adapted to receive an automotive vehicle which may be driven into any one of said berths, a lane communicating with all of said berths, an approach lane leading to the first lane, a berth assignment sign, including electric signal means in the approach lane and in advance of the first lane, and including visual indicator means corresponding to each one of said berths, means to selectively energize one of said indicator means to indicate to the driver of a vehicle into which berth he should drive the vehicle, and means to automatically de-energize the energized indicator means a predetermined period of time after it has been energized.

3. In combination, a plurality of berths, each adapted to receive an automotive vehicle which may be driven into any one of said berths, a lane communicating with all of said berths, an approach lane leading to the first lane, a berth assignment sign, including electric signal means in the approach lane and in advance of the first lane, and including visual indicator means corresponding to each one of said berths, means to selectively energize one of said indicator means to indicate to the driver of a vehicle into which berth he should drive the vehicle, an additional electric visual signal means in said sign, means to automatically de-energize said additional signal means whenever any one of said indicator signal means is energized, means to automatically de-energize the energized indicator means a predetermined period of time after it has been energized, and means to automatically energize said additional signal means upon said indicator means becoming deenergized.

4. In combination, a plurality of berths, each adapted to receive an automotive vehicle which may be driven into any one of said berths, a lane communicating with all of said berths, an approach lane leading to the first lane, a berth assignment sign, including electric signal means in the approach lane and in advance of the first lane, and including visual indicator means corresponding to each one of said berths, means to selectively energize one of said indicator means to indicate to the driver of a vehicle into which berth he should drive the vehicle, a plurality of berth number signs, one at each berth, and means to illuminate the berth number sign of the berth corresponding to the energized signal indicator means simultaneously with the energization thereof.

5. In combination, a plurality of berths, each adapted to receive an automotive vehicle which may be driven into any one of said berths, a lane communicating with all of said berths, an approach lane leading to the first lane, a berth assignment sign, including electric signal means in the approach lane and in advance of the first lane, and including visual indicator means corresponding to each one of said berths, means located at a point remote from the berth assignment sign to selectively energize one of said indicator means to indicate to the driver of a vehicle into which berth he should drive the vehicle, and indicator light means at said remote point to indicate that no signal indicator means on the berth assignment sign is actuated, and means to deenergize said berth assignment sign a predetermined time after it has been energized.

6. In combination, a plurality of berths, each adapted to receive an automotive vehicle which may be driven into any one of said berths, a lane communicating with all of said berths, an approach lane leading to the first lane, a berth assignment sign, including electric signal means in the approach lane and in advance of the first lane, and including visual indicator means corresponding to each one of said berths, means to selectively energize one of said indicator means to indicate to the driver of a vehicle into which berth he should drive the vehicle, indicator light means at a point remote from said berth assignment sign to indicate that no signal indicator means on the berth assignment sign is actuated, electric signal means at said remote point to indicate that one of said indicator signal means on the berth assignment sign is energized, and electric signal means at said remote point to indicate that the vehicle has reached and occupies the assigned berth.

7. In combination, a plurality of berths, each adapted to receive an automotive vehicle which may be driven into any one of said berths, a lane communicating with all of said berths, an approach lane leading to the first lane, a berth assignment sign, including electric signal means in the approach lane and in advance of the first lane, and including visual indicator means corresponding to each one of said berths, means to selectively energize one of said indicator means to indicate to the driver of a vehicle into which berth he should drive the vehicle, a plurality of berth number signs, one at each berth, means to illuminate the berth number sign of the berth corresponding to the energized signal indicator means simultaneously with the energization thereof, and means controlled by the entry of the vehicle into the berth whose berth number sign is energized to de-energize said berth number sign for said berth.

8. In combination, a plurality of berths, each adapted to receive an automotive vehicle which may be driven into any one of said berths, a lane communicating with all of said berths, an approach lane leading to the first lane, a berth assignment sign, including electric signal means in the approach lane and in advance of the first lane, and including visual indicator means corresponding to each one of said berths, means to selectively energize one of said indicator means to indicate to the driver of a vehicle into which berth he should drive the vehicle, a plurality of berth number signs, one at each berth, means to illuminate the berth number sign of the berth corresponding to the energized signal indicator means simultaneously with the energization thereof, means controlled by the entry of the vehicle into the berth whose berth number sign is energized to de-energize said berth number sign for said berth, indicator light means, at a point remote from said berth assignment sign to indicate that no signal indicator means on the berth assignment sign is actuated, electric signal means at said remote point to indicate that one of said indicator signal means on the berth assignment sign is energized and means at said remote point to indicate that the berth number sign of the indicated berth has been de-energized by reason of entry of a vehicle into said berth.

9. In combination, a plurality of berths, each adapted to receive an automotive vehicle which may be driven into any one of said berths, a lane communicating with all of said berths, an approach lane leading to the first lane, a berth assignment sign, including electric signal means in the approach lane and in advance of the first lane, and including visual indicator means corresponding to each one of said berths, means to selectively energize one of said indicator means to indicate to the driver of a vehicle into which berth he should drive the vehicle, a plurality of berth number signs, one at each berth, means to illuminate the berth number sign of the berth corresponding to the energized signal indicator means simultaneously with the energization thereof, means controlled by the entry of the vehicle into the berth whose berth number sign is energized to de-energize said berth number sign for said berth, indicator light means, at a point remote from said berth assignment sign to indicate that no signal indicator means on the berth assignment sign is actuated, electric signal means at said remote point to indicate that one of said indicator signal means on the berth assignment sign is energized, means at said remote point to indicate that the berth number sign of the indicated berth has been de-energized by reason of entry of a vehicle into said berth, electric signal means on the berth number sign, means to energize said last mentioned signal means, a second signal means on said berth number sign and means to de-energize the first signal on the berth number sign.

10. In a vehicle despatching system the combination comprising, a vehicle station comprising a plurality of vehicle berths, a lane of approach to said berths, a despatcher's control desk within line of sight of said lane of approach, a berth assignment signalling means in said lane of approach, a plurality of berth signalling means, one for each berth, said control desk comprising a plurality of control switches, one for each berth, means, controlled by said switches to energize said lane of approach berth assignment signalling means, visual indication means to visually indicate a particular berth designation for the purpose of directing an entering vehicle to a particular berth, means controlled by said switch controlling means to simultaneously energize the particular berth signalling means, of said plurality of berth signalling means, to which, said vehicle is directed, means to maintain said lane of approach berth assignment signalling means energized for a predetermined length of time, and means to keep said particular berth signalling means energized until the bus enters said particular berth.

11. In combination, a plurality of berths, each adapted to receive an automotive vehicle, a despatcher's control desk remote from said berths, visual indicator means at said desk to indicate the presence of an automotive vehicle in any one of said berths, means to indicate at said desk the departure of a vehicle from any berth previously occupied, signal means at each of said berths, and means at said desk to control said signal means to control departure of said vehicle from said berth.

12. In combination, a plurality of berths, each adapted to receive an automotive vehicle which may be driven into any one of said berths, a lane communicating with all of said berths, an approach lane leading to the first lane, a berth assignment sign, including electric signal means in the approach lane and in advance of the first lane, and including visual indicator means corresponding to each one of said berths, means to selectively energize one of said indicator means to indicate to the driver of a vehicle into which berth he should drive the vehicle, a plurality of berth number signs, one at each berth, means to illuminate the berth number sign of the berth corresponding to the energized signal indicator means simultaneously with the energization thereof, means to automatically deenergize said energized sign indicator means after a predetermined period, and means controlled by said vehicle to deenergize said berth member sign upon the entry of the vehicle in said berth.

13. In combination, a plurality of berths, each adapted to receive an automotive vehicle which may be driven into any one of said berths, a lane communicating with all of said berths, an approach lane leading to the first lane, a berth assignment sign, including electric signal means in the approach lane and in advance of the first lane, and including visual indicator means corresponding to each one of said berths, means to selectively energize one of said indicator means to indicate to the driver of a vehicle into which berth he should drive the vehicle, a plurality of berth number signs, one at each berth, means dependent upon the energization of said indicator means to illuminate the berth number sign of the berth corresponding to the energized signal indicator means, and means controlled by the entry of the vehicle into the berth whose berth number sign is energized to indicate entry of said vehicle into said berth.

14. In combination, a plurality of berths, each adapted to receive an automotive vehicle which may be driven into any one of said berths, a lane communicating with all of said berths, electric signal means in advance of said lane to indicate to the driver of a vehicle into which berth he should drive the vehicle, electrically operated means to signal the driver at the berth corresponding to the first indicated berth that it is the berth he should drive into, means to operate said signal means upon operating said indicating means, and means controlled by entry of the vehicle into the indicated berth to signal the entry of said vehicle into said berth.

15. In combination, a plurality of berths, each adapted to receive an automotive vehicle which may be driven into any one of said berths, a lane communicating with all of said berths, electric signal means in advance of said lane to indicate to the driver of a vehicle into which berth he should drive the vehicle, electrically operated means to signal the driver at the berth corresponding to the first indicated berth that it is the berth he should drive into, means to operate said signal means upon operating said indicating means, means controlled by entry of the vehicle into the indicated berth to signal the entry of said vehicle into said berth, and means to indicate at a point remote from said berth and likewise dependent upon the entry of the vehicle into the indicated berth that the vehicle has entered the indicated berth.

16. In combination, a plurality of berths, each adapted to receive an automotive vehicle which may be driven into any one of said berths, a lane communicating with all of said berths, electric signal means in advance of said lane to indicate to the driver of a vehicle into which berth he should drive the vehicle, electrically operated means to signal the driver at the berth corresponding to the first indicated berth that it is the berth he should drive into, means to operate said signal means upon operating said indicating means, means controlled by entry of the vehicle into the indicated berth to signal the entry of said vehicle into said berth, and means to indicate at a remote point that the indicating means is not indicating.

17. In combination, a plurality of berths, each adapted to receive an automotive vehicle which may be driven into any one of said berths, a lane communicating with all of said berths, electric signal means in advance of said lane to indicate to the driver of a vehicle into which berth he should drive the vehicle, electrically operated means to signal the driver at the berth corresponding to the first indicated berth that it is the berth he should drive into, means to operate said signal means upon operating said indicating means, means controlled by entry of the vehicle into said berth, means to indicate at a remote point that the indicating means is not indicating, and means to indicate at said remote point that said indicating means is indicating.

18. In combination, a plurality of berths, each adapted to receive an automotive vehicle which may be driven into any one of said berths, a lane communicating with all of said berths, an approach lane leading to the first lane, a berth assignment sign, including electrical signal means in the approach lane and in advance of the first lane, and comprising visual indicator means corresponding to each one of said berths, means to selectively energize one of said indicating means to indicate to the driver of a vehicle into which berth he should drive the vehicle, a plurality of electrical berth indicator means remote from said assignment sign, one for each respective berth, means dependent upon the energization of one of said visual indicator means to energize the remote indicator means corresponding to the energized visual indicator means, and means controlled by the entry of the vehicle into the berth whose remote indicator means is energized, to indicate entry of said vehicle into said berth.

19. In combination, a plurality of berths, each adapted to receive an automotive vehicle which may be driven into any one of said berths, a lane communicating with all of said berths, an approach lane leading to the first lane, a berth assignment sign, including electrical signal means in the approach lane and in advance of the first lane, and comprising visual indicator means corresponding to each one of said berths, means to selectively energize one of said indicating means to indicate to the driver of a vehicle into which berth he should drive the vehicle, a plurality of electrical berth indicator means remote from said assignment sign, one for each respective berth, means dependent upon the energization of one of said visual indicator means to energize the remote indicator means corresponding to the energized visual indicator means, means controlled by the entry of the vehicle into the berth whose remote indicator means is energized, to indicate entry of said vehicle into said berth, and means controlled by the exit of the vehicle from said berth to indicate the departure of said vehicle.

20. In combination, a plurality of berths, each adapted to receive an automotive vehicle which may be driven into any one of said berths, a lane communicating with all of said berths, an approach lane leading to the first lane, a berth assignment sign including electrical signal means in the approach lane and in advance of the first lane, and comprising visual indicator means corresponding to each one of said berths, means to selectively energize one of said indicating means to indicate to the driver of a vehicle into which berth he should drive the vehicle, a plurality of electrical berth indicator means remote from said assignment sign, one for each respective berth, means dependent upon the energization of one of said visual indicator means to energize the remote indicator means corresponding to the energized visual indicator means, simultaneously with the energization thereof, and means controlled by the entry of the vehicle into the berth whose remote indicator means is energized, to indicate the entry of said vehicle into said berth.

21. In combination, a plurality of berths, each adapted to receive an automotive vehicle which may be driven into any one of said berths, a lane communicating with all of said berths, an approach lane leading to the first lane, a berth assignment sign, including electrical signal means in the approach lane and in advance of the first lane, and comprising visual indicator means corresponding to each one of said berths, means to selectively energize one of said indicating means to indicate to the driver of a vehicle into which berth he should drive the vehicle, a plurality of electrical berth indicator means remote from said assignment sign, one for each respective berth, means dependent upon the energization of one of said visual indicator means to energize the remote indicator means corresponding to the energized visual indicator means, and means controlled by the entry of the vehicle into the berth whose remote indicator means is energized, to de-energize the energized remote indicator means.

22. In combination, a plurality of berths, each adapted to receive an automotive vehicle which may be driven into any one of said berths, a lane communicating with all of said berths, an approach lane leading to the first lane, a berth assignment sign, including electrical signal means in the approach lane and in advance of the first lane, and comprising visual indicator means corresponding to each one of said berths, means to selectively energize one of said indicating means to indicate to the driver of a vehicle into which berth he should drive the vehicle, a plurality of electrical berth indicator means remote from said assignment sign, one for each respective berth, means dependent upon the energization of one of said visual indicator means to energize the remote indicator means corresponding to the energized visual indicator means, means controlled by the entry of the vehicle into the berth whose remote indicator means is energized, to de-energize the energized remote indicator means, another set of indicator means remote from said berth assignment sign, one for each respective berth, and means controlled by the entry of said vehicle into said berth to energize the indicator means of said other set corresponding to the entered berth.

23. In combination, a plurality of berths, each adapted to receive an automotive vehicle which may be driven into any one of said berths, a lane communicating with all of said berths, an approach lane leading to the first lane, a berth assignment sign, including electrical signal means in the approach lane and in advance of the first lane, and comprising visual indicator means corresponding to each one of said berths, means to selectively energize one of said indicating means to indicate to the driver of a vehicle into which berth he should drive the vehicle, a plurality of electrical berth indicator means remote from said assignment sign, one for each respective berth, means dependent upon the energization of one of said visual indicator means to energize the remote indicator means corresponding to the energized visual indicator means, means controlled by the entry of the vehicle into the berth whose remote indicator means is energized, to de-energize the energized remote indicator means, another set of indicator means remote from said berth assignment sign, each associated with a respective berth, means controlled by the entry of said vehicle into said berth to energize the indicator means of said other set corresponding to the entered berth, and means controlled by the departure of said vehicle from said berth to de-energize said last energized indicator means.

24. In combination, a plurality of berths, each adapted to receive an automotive vehicle which may be driven into any one of said berths, a lane communicating with all of said berths, an approach lane leading to the first lane, a berth assignment sign, including electrical signal means in the approach lane and in advance of the first lane, and comprising visual indicator means corresponding to each one of said berths, means to selectively energize one of said indicating means to indicate to the driver of a vehicle into which berth he should drive the vehicle, a plurality of electrical berth indicator means remote from said assignment sign, one for each respective berth, means dependent upon the energization of one of said visual indicator means to energize the remote indicator means corresponding to the energized visual indicator means, treadle operated switch means at each berth adapted to be actuated by the wheels of a vehicle rolling thereover, circuit means including the remote indicator means and the treadle operated switch means, and said treadle operated switch means actuable by the entry of the vehicle into the berth whose remote indicator means is energized, to de-energize said remote indicator means.

25. In a vehicle despatching system, the combination comprising a vehicle station comprising a plurality of vehicle berths, a lane of approach to said berths, a despatcher's control desk within line of sight of said lane of approach, a berth assignment signalling means in said lane of approach, a plurality of berth signalling means, one for each berth, said control desk comprising a plurality of control switches, one for each berth, means controlled by said switches to energize said lane of approach berth assignment signalling means, visual indicating means to visually indicate a particular berth designation for the purpose of directing an entering vehicle to a particular berth, means controlled by said switch controlling means to simultaneously energize the particular berth signalling means, to which said vehicle is directed, and means to maintain said particular berth signalling means energized, until the vehicle enters said particular berth.

BENJAMIN COOPER.
STANLEY A. KROLL.

REFERENCES CITED

The following references are of record in the file of this patent:

UNITED STATES PATENTS

| Number | Name | Date |
|---|---|---|
| 1,459,628 | Hockaday | June 19, 1923 |
| 1,689,227 | Burrell | Oct. 20, 1928 |
| 1,798,128 | White | Mar. 24, 1931 |
| 2,334,333 | Kiner | Nov. 16, 1943 |
| 2,482,610 | Burn | Sept. 20, 1949 |
| 2,536,290 | Jones | Jan. 2, 1951 |

FOREIGN PATENTS

| Number | Country | Date |
|---|---|---|
| 568,622 | Great Britain | Apr. 12, 1945 |